Figure 22:
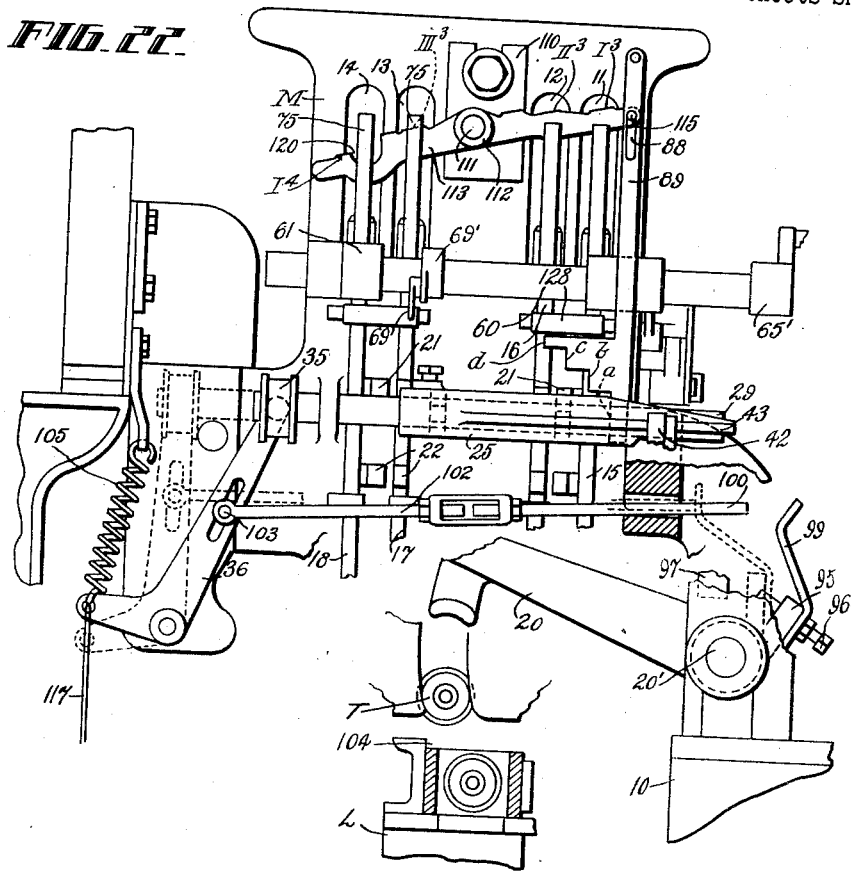

Dec. 12, 1944.
V. H. JENNINGS ET AL
2,364,979
BOBBIN STACK SELECTOR
Filed Jan. 29, 1944
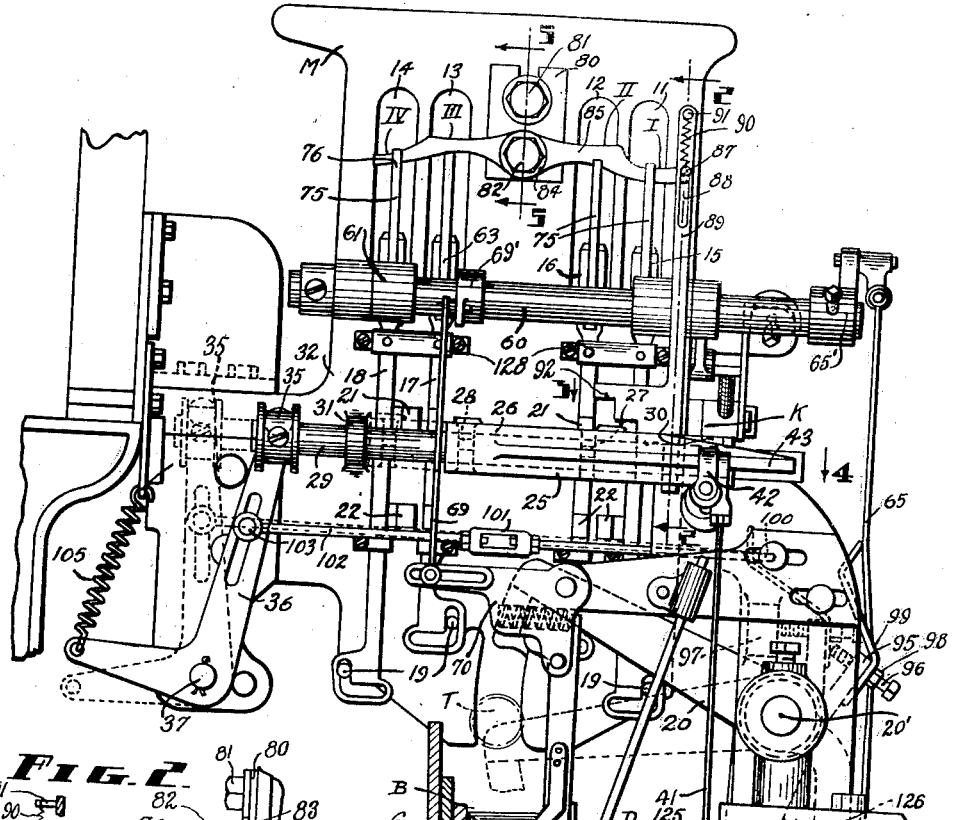
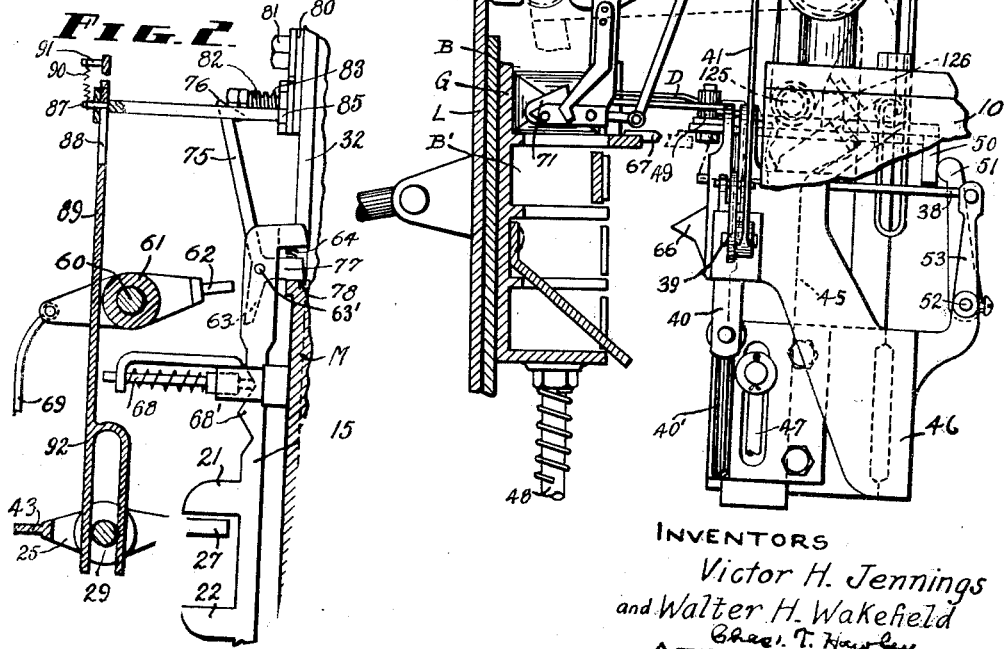
INVENTORS
*Victor H. Jennings*
and *Walter H. Wakefield*
ATTORNEY

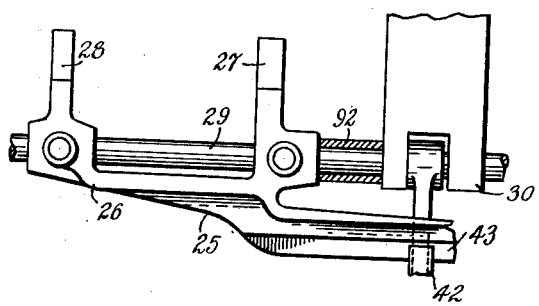
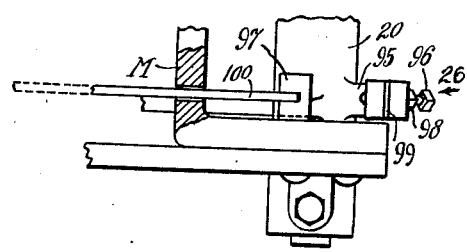
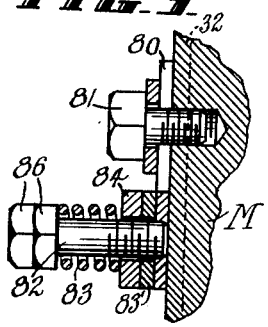
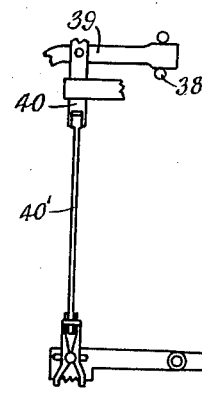
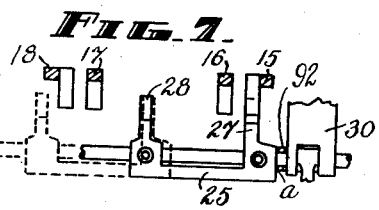
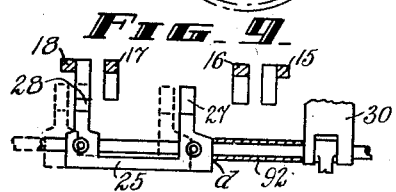
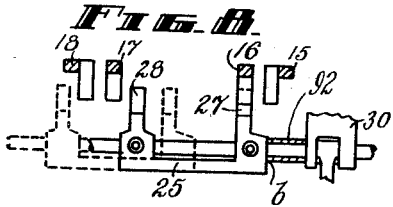
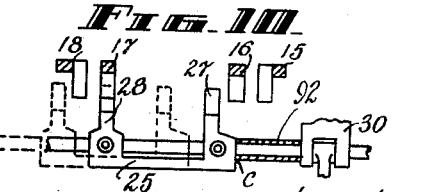

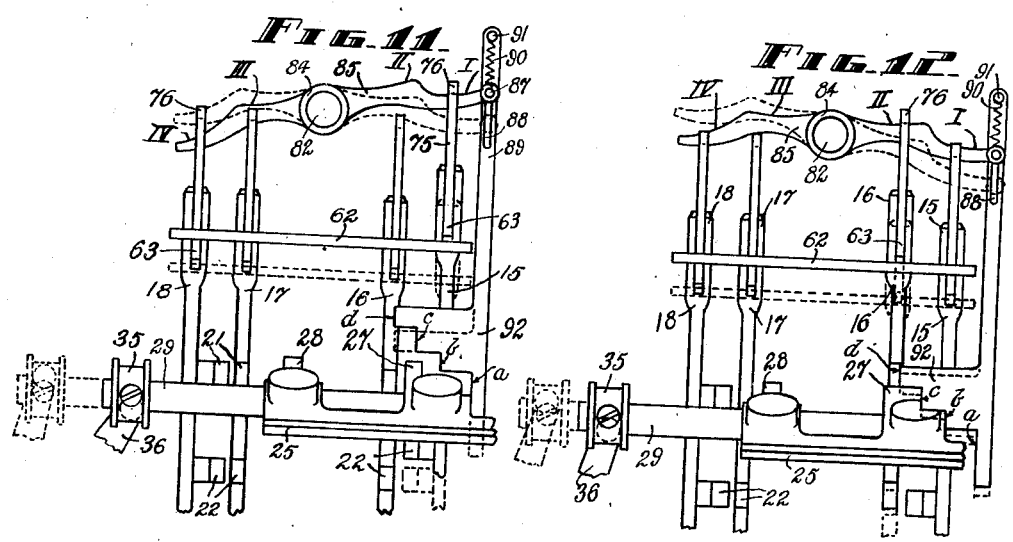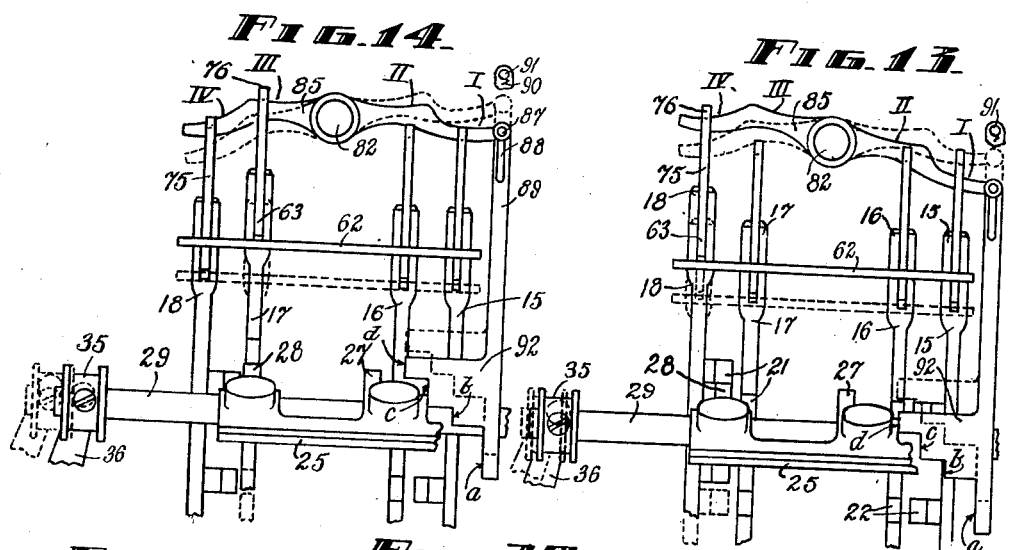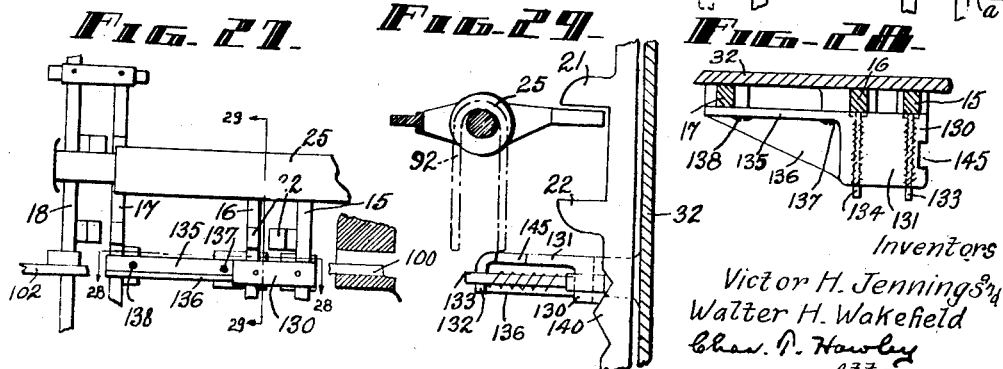

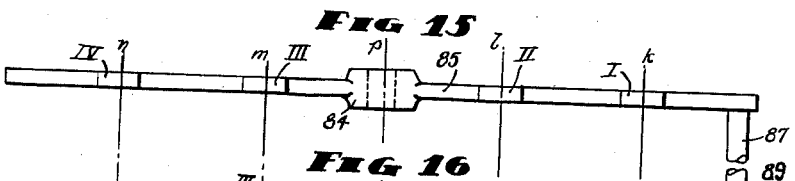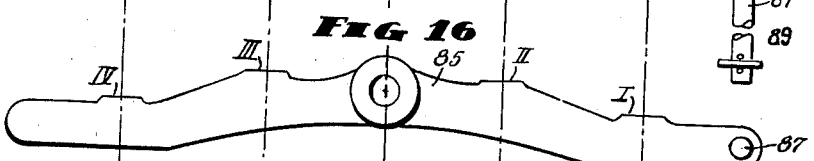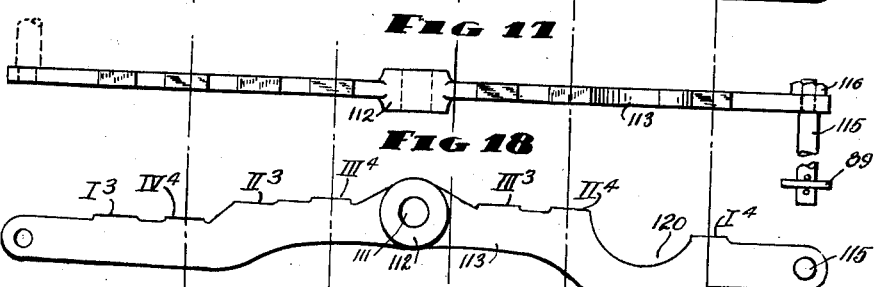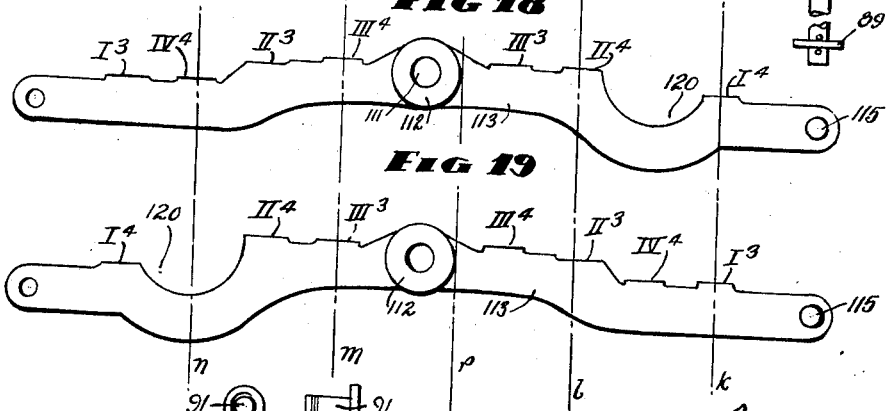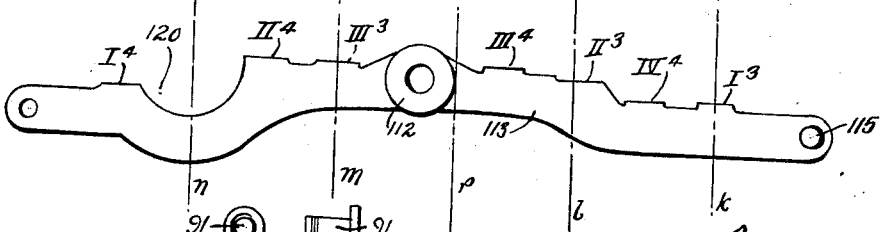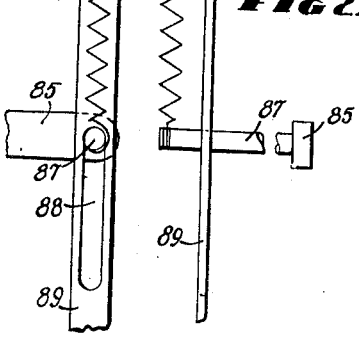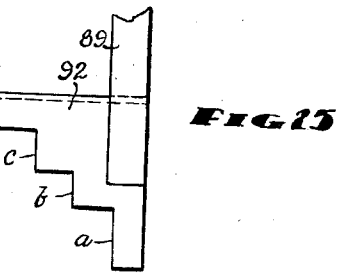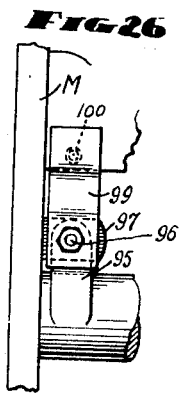

Inventors
Victor H. Jennings and
Walter H. Wakefield
Chas. T. Hawley
Attorney

Patented Dec. 12, 1944

2,364,979

UNITED STATES PATENT OFFICE 2,364,979

BOBBIN STACK SELECTOR

Victor H. Jennings and Walter H. Wakefield, Worcester, Mass., assignors to Crompton & Knowles Loom Works, Worcester, Mass., a corporation of Massachusetts Application January 29, 1944, Serial No. 520,264

19 Claims. (Cl. 139—232)

This invention relates to improvements in the bobbin delivery mechanisms of multi-stack weft replenishing looms and it is the general object of the invention to provide simple mechanism by which a plurality of stacks of similar bobbins can be utilized for the replenishment of one or more shuttles.

The usual multicolor weft replenishing loom employs a magazine having several stacks of reserve bobbins, four stacks being provided in the ordinary loom. Under the normal conditions of operation of such a loom the stacks carry wefts of distinctive types and a fabric may be woven having four different kinds of weft by the use of four shuttles each of which is replenished from its own stack in the magazine. It is desirable, however, to use the four stack type of magazine under conditions other than those requiring four different kinds of weft, such for instance, as the weaving of filling mixed pick and pick fabrics, or fabrics in which one weft is predominant and another weft is used only occasionally.

In copending application Serial No. 490,155 filed June 9, 1943, there is set forth bobbin delivery mechanism including a lever pivoted between its ends and intermediate the range of action of two bobbin releasers. The lever is connected to a stop for the releaser selector and the releasers by their downward movement rock the lever first in one direction and then in the other direction to cause the stop to effect alternate registry of the selector with the releasers. The preferred form of the present invention contemplates an extension of the idea set forth in the aforesaid application in that a lever and stepped stop are provided which effect registry of the selector with all four stacks of the magazine in such rotation as to draw bobbins uniformly from the several stacks.

The stepped stop tends to move to certain of its positions by gravity while the selector is in an interfering position, and it is necessary to provide means for moving the selector to non-interfering position so that the stop can fall successively to certain of its positions. It is a further object of the present invention to provide means whereby some part having a movement incident to a replenishing operation of the loom, such as a transferrer arm, acts to move the selector from under the stop to permit the latter to fall to certain of its positions. By use of this mechanism all four stacks of the magazine can be utilized to replenish one type of weft either in one shuttle or a plurality of shuttles following each other in rotation without relying on a shift of shuttle boxes to effect temporary movement of the selector away from the stop.

It is a further object of the present invention to provide a modified form of lever for the stepped stop so constructed that in one setting it will cooperate with four releasers to give the stop four different positions, but in a reversed setting will give the stop only three positions by cooperation with three releasers. This type of mechanism makes it possible to convert a filling mixing loom to one employing two colors one of which is predominant and can be replenished from three stacks of the magazine and the other of which is less frequently used and can be replenished from the fourth stack.

It is another object of the present invention to provide a lifting connection between the lever and stop so constructed as to prevent excess movement of the stop when it is raised positively by the lever.

With these and other objects in view which will appear as the description proceeds, the invention resides in the combination and arrangements of parts hereinafter described and set forth.

In the accompanying drawings, wherein two forms of the invention are shown,

Fig. 1 is a side elevation of a weft replenishing mechanism having the preferred form of the invention applied thereto and showing parts of the lay in section, Fig. 2 is an enlarged vertical section on line 2—2, Fig. 1, Figs. 3 and 4 are enlarged detail plans, partly in section, looking in the direction of arrows 3 and 4, respectively, of Fig. 1.

Figure 23:
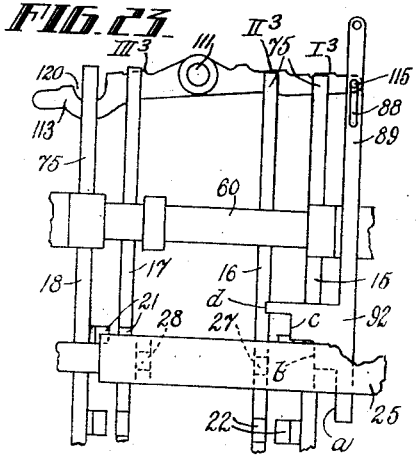
Figure 24:
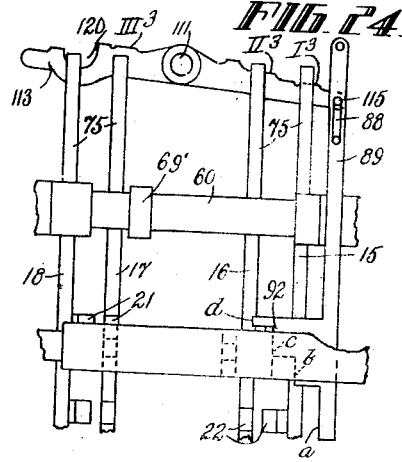

Fig. 5 is an enlarged detail vertical section on line 5—5, Fig. 1,

Fig. 6 is a diagrammatic view showing the cam for operating the magazine setting lever when the invention is used on a filling mixing pick and pick loom, Figs. 7 and 10 are views similar to Fig. 3 on a smaller scale showing the selector in the four positions of registry it occupies in the preferred form of the invention, one view for each stack, Figs. 11 to 14 are diagrammatic views similar to parts of Fig. 1 showing different positions of the selector stop and controlling lever therefor, and corresponding, respectively, to the position of the selector shown in Figs. 7 to 10, Figs. 15 and 16 are enlarged plan and side views, respectively, of the preferred form of stop control lever shown in Fig. 1, Fig. 17 is a plan view of a modified form of stop control lever, Fig. 18 is a side view of the lever shown in Fig. 17 as seen from the center of the loom when set to deliver bobbins from all four cells of the magazine, Fig. 19 is a view similar to Fig. 18, but showing the lever reversed to effect delivery of bobbins from three cells of the magazine, Figs. 20 and 21 are side and front views, respectively, of the stop rod usable with either form of stop control lever, Fig. 22 is a view similar to a portion of Fig. 1 but showing the modified lever set as shown in Fig. 19 to deliver bobbins from three bobbin stacks, Figs. 23 and 24 are diagrammatic views showing the lever of Fig. 19 in the position it occupies to offset registry of the selector with the second and third stacks, respectively, Fig. 25 is a side elevation of the selector stop used with both forms of the invention, Fig. 26 is a detailed front elevation looking in the direction of arrow 26, Fig. 4, showing the actuator for the selector used with both forms of the invention in the actuating position it assumes when pushing the selector rearwardly, Fig. 27 is similar to Fig. 1 but shows a modified form of yielding lock for the releasers, and Figs. 28 and 29 are horizontal and vertical sections, respectively, on line 28—28 and 29—29, Fig. 27, Fig. 29 being enlarged.

Referring to Fig. 1, there is shown a loom frame 10 supporting a magazine M which in the present instance is of the multi-stack type and is provided with four bobbin stacks 11, 12, 13 and 14. The stacks are provided with bobbin releasers 15, 16, 17 and 18, respectively, each of which cooperates with a bobbin releasing cradle 19 at the lower end thereof. These releasers are normally down and the cradles empty, but when replenishment is indicated one of the releasers rises to rock its cradle to receive a bobbin from the associated stack, after which depression of the previously raised releaser rocks the cradle in reverse direction back to its normal position to discharge the bobbin therein so that it may pass to transfer position indicated at T, Fig. 1, under a transferrer arm 20 pivoted at 20' to the magazine. Each releaser is provided with top and bottom lugs 21 and 22, respectively, by means of which it is raised and lowered.

The magazine is provided with a stack or releaser selector 25 which includes in its construction a casting 26 from which project front and back lifting and depressing fingers 27 and 28, respectively, see Fig. 3. A rod or shaft 29 to which casting 26 is secured slides horizontally in front and back bearings 30 and 31, respectively, on the inside frame 32 of the magazine. The shaft 29 has secured to the rear end thereof a collar 35 cooperating with the upper end of a positioning lever 36 pivoted at 37 to the magazine.

The weft detector D is mounted in front of a gang G of shuttle boxes on the lay L and controls the position of a pin 38 which cooperates with a magazine setting lever 39 floating on head or block 40 on the upper end of a vertically reciprocating rod 40'. The lever 39 is connected by a rod 41 to an arm 42 operatively associated with a fin 43 on casting 26.

The gang G of the preferred form of the invention has top and bottom boxes B and B', respectively, which may shift vertically in a four pick cycle to place first one and then the other box in active picking position for two successive picks. When upper box B rises with a shuttle in it the detector has a detecting operation and if sufficient weft is present pin 38 is moved forwardly, or to the right as viewed in Fig. 1, out of the path of lever 39 and the latter is moved down idly without moving rod 41. If, on the other hand, the detector indicates weft exhaustion, rod 38 remains in the path of lever 39 and as the block 40 descends it causes the lever to depress rod 41 and thereby rock the selector 25 in a counterclockwise direction as viewed in Fig. 2 to raise the fingers 27 and 28 and whichever releaser registers with a finger. Subsequently block 40 rises to lift lever 39 and cause the latter to raise rod 41 and thereby rock the selector in a clockwise direction as viewed in Fig. 2 to depress the previously raised releaser. As shown in Fig. 6 a cam 44 turning every second pick of the loom and forming no essential part of the invention reciprocates block 40 in one pick of the loom, causing the selector to raise a releaser and then immediately depress it while box B is still raised.

In order that the detector may rise with the gang G it is mounted on a carrier 45 guided for vertical movement in a frame 46 secured to the loom. The carrier is connected by a rod 47 to the driving mechanism of the lifter rod 48 of gang G in such manner that the rods rise and fall in unison, thereby keeping the detector D in register with the top shuttle box B. The detector D comprises a horizontally movable slide 49 having a depending arm 50 for engagement with a lever 51 secured to a rock shaft 52 on which is secured a second arm 53 the upper end of which is connected to rod 38. The rock shaft 52 has a stationary axis and arm 50 is of sufficient length to communicate its control over levers 51 and 53 and rod 38 during vertical movement of the detector.

The rising and falling weft detector and the manner of its control of rod 38 of itself forms no part of the present invention and may be the same as substantially set forth in copending application, Serial No. 403,326, filed July 21, 1941, by R. G. Turner. It is thought sufficient for present purposes to state that exhaustion of weft in the top shuttle box B causes rocking of the selector in a direction to raise the fingers 27 and 28, and that the latter are subsequently depressed. The releaser registering with the selector is therefore first elevated and then depressed to initiate and then complete bobbin delivery from the associated stack. Since the invention relates particularly to delivery of bobbins, certain features of the detector, such as prevention of indication when gang G descends, are omitted from the drawings and description.

The magazine has a shaft 60 journaled in the upper part thereof and provided with a casting 61 secured thereto and including a shelf 62 for cooperation with dogs 63 one of which is pivoted at 63' to the upper end of each releaser. Ordinarily each dog is in the idle down position shown in Fig. 2 when its releaser is down, but when the releaser is raised the dog is moved to the left as viewed in Fig. 2 by a spring 64 to its operating position over shelf 62. Upon subsequent depression of the releaser the dog engages the shelf to turn shaft 60 in a clockwise direction as viewed in Fig. 2. A spring plunger 68 cooperates with a wedge 68' on slide 15, see Fig. 2, to assist the selector in moving the releaser to its extreme high and low positions.

Movement of shaft 60 has two effects one of which is to lower a rod 65 attached to arm 65' on shaft 60 and connected to the transferrer latch 66, thereby raising the latter into the path of the lay carried bunter 67, and the other effect of which is to raise rod 69 attached to arm 69' on shaft 60 and connected to a shuttle position detector 70 to move the latter from its normal forward position to its rear detecting position. This movement of shaft 60 occurs while the lay is in the back part of its stroke and as the lay moves forwardly it engages the head 71 of the shuttle detector to rock the latter in a counter-clockwise direction as viewed in Fig. 1, thereby exerting a downward pull on rod 69 to reset the magazine by rocking shaft 60 backward to its normal position shown in Fig. 2, and also depress the transferrer arm 20 to the dotted line position shown in Fig. 1 to insert the released bobbin into the shuttle in box B. Shaft 60 is held in either of its extreme positions by a well-known lock mechanism designated at K, Fig. 1.

Each of the dogs 63 has integral therewith an upwardly extending hook 75 having a head 76 normally spaced away from the magazine plate 32. When any releaser rises its hook 75 moves toward the plate 32 simultaneously with movement of the dog 63 thereof to operating position over shelf 62. Upon subsequent descent of the raised releaser the hook head 76 moves down along a path adjacent to the plate 32 until the releaser nears the bottom of its movement, whereupon the dog 63 and its hook 75 are rocked back to their normal position by engagement of a lug 77 on dog 63 with a shoulder 78 on plate 32. The hooks 75 are shown more particularly in an application filed by Patterson Serial No. 515,203, December 22, 1943, operating somewhat in the manner of a hook shown in another copending application Serial No. 490,155. Reference may also be had to Ryon Patent No. 1,030,748 for further understanding of the magazine.

In carrying the preferred form of the present invention into effect, a control is provided for the releaser selector operative to register the latter with each of the four releasers in a given sequence so that the bobbins will be drawn uniformly from all the stacks of the magazine. Under these conditions the stacks all carry bobbins of the same kind and box B can receive a series of shuttles one at a time, which carry but one kind of weft. It will be obvious as the description proceeds, however, that the control for the delivery of the bobbins from the magazine is not necessarily limited to the weaving of a pick and pick fabric.

A small stand 80 is secured at 81 to plate 32 of the magazine, see Figs. 1 and 5, and has secured thereto a stud 82, which is preferably midway between the hooks 75 of the bobbin releasers 16 and 17. A spring 83 around stud 82 bears against hub 84 of a lever 85 pivoted on the stud, and adjusting nuts 86 on the stud 82 permit variation in the force exerted by the spring 83. The latter cooperates with a friction washer 83' for the purpose of frictionally holding the lever 85 in any of the positions to which it may be moved. Lever 85 has four working surfaces designated at I, II, III and IV, see Figs. 1, 11 to 13, 15 and 16. These working surfaces each cooperate with a hook 75 and are related to lever 85 substantially as shown in Fig. 16. The right or forward end of lever 85 has secured thereto a stud 87 the free end of which passes through a slot 88 in a depending flat rod 89. A light tension spring 90 between stud 87 and a stud 91 on the top of rod 89 assists gravity to hold the rod down but yields for a purpose to be described, see Figs. 20 and 21.

The bottom of rod 89 is secured to a selector stop head 92, see Fig. 25 having four stop surfaces a, b, c and d, which are arranged at different distances from the front bearing 30 for the rod 29, and correspond, respectively, to releasers 15, 16, 17 and 18. These surfaces are for engagement one by one with the casting 26 and serve to position the selector 25 in register with the different releasers. Head 92 rests against bearing 30 which limits its forward movement to the right, see Fig. 3.

The transferrer arm 20 has a lug 95 carrying a stop screw 96 for engagement with a stop lug 97 fixed to the frame of the magazine, see Figs. 1 4 and 26. The screw 96 limits angular movement of the transferrer arm and prevents it from moving too far downwardly during a transferring operation. Secured to lug 95 by screw 96 and a check nut 98 is an actuator finger 99 for engagement with the forward end of a rod 100 slidably mounted in the magazine frame, see Fig. 4. Rod 100 is connected by a turnbuckle 101 to a second rod 102 pivotally connected as at 103 to the previously described lever 36. Adjustment as indicated in Fig. 1 is provided between the rod 102 and lever 36 to vary the amount of angular movement of the latter. As the transferrer arm descends from the full to the dotted line position shown in Fig. 1 during a transferring operation the actuator 99 moves rearwardly, or to the left as viewed in Fig. 1, and engages rod 100, pushing the latter backwardly to effect movement of lever 36 from the full to the dotted line position of Fig. 1. The rearward movement of lever 36 thus indicated moves the selector 25 rearwardly to a temporary position with casting 26 to the rear of stop surface d on head 92 for a purpose to be set forth hereinafter.

Assuming that the magazine is set to deliver a bobbin from the front stack 11, selector 25 will be in its extreme front position with finger 27 thereof registered with releaser 15. The selector will be in this position because stop head 92 is held in its highest position by lever 85 with surface a in the path of and engaging the selector. Up motion of releaser 15 incident to indication of weft exhaustion will cause the hook 75 thereof to move in a right hand direction as viewed in Fig. 2 to place its head 76 over area I of lever 85. At this time releaser 15, head 92 and selector 25 are related as indicated in Fig. 7. Those parts of the stop head 92 to the left of surface a as viewed in Fig. 25 will be over the selector so that the latter is in an interfering position to prevent downward movement of surface b to controlling position. As the raised releaser 15 descends its hook head 76 engages working surface I and moves lever 85 from the full line to the dotted line position shown in Fig. 11, thereby permitting the stop head to fall as far as it can against the selector and causing the stud 87 to move downwardly in slot 88. During the following transfer actuator 99 will move the selector rearwardly as already stated to a temporary position behind surface b and the stop head will fall until the upper end of slot 88 engages stud 87 to locate surface b in the path of the selector. As the transferrer arm rises the actuator 99 has a return stroke and spring 105 connected to lever 36 causes the selector to move forwardly until it is registered with the second releaser 16 by surface b, see Fig. 8.

When the detector next indicates exhaustion the selector will raise releaser 16 and when the latter descends the head 76 of its hook will engage working surface II of lever 85 and rock the latter from the full line to the dotted line position of Fig. 12. Surface II is so located with respect to the axis of lever 85 that it causes the stud 87 to move to its lowest position, but the selector, being in interfering position, prevents the stop head from falling to its lowest position, hence the stud 87 moves down in the slot 88. On the ensuing transfer the selector is moved out of interfering position and the head moves down to place the stop surface d in the path of the selector, after which the parts assume the relationship shown in Fig. 9. It is to be understood that the motion which the actuator 99 imparts to the selector is sufficient to move the latter slightly behind the stop head so that the latter has opportunity to fall to is lowest position to engage the selector 25 as the spring 105 moves the selector forwardly during ascent of the transferrer arm 20. The selector is now in register with the rearmost stack with its finger 28 in position to operate releaser 18.

Incident to the third replenishment selector 25 will depress releaser 18, causing the rearmost hook 75 to engage surface IV of lever 85 and move the latter from the full line position to the dotted line position of Fig. 13. This causes an upward movement of stud 87 which pulls the stop head positively away from shaft 29 a sufficient distance to locate stop surface c in the path of the selector and effect registry of the latter with the third releaser 17, see Fig. 10. Spring 90 prevents excess upward movement of rod 89 at this time.

During the fourth replenishing operation surface III will be engaged by hook head 76 of releaser 17 as the latter descends and lever 85 will be rocked from the full line to the dotted line position in Fig. 14, thereby positively, raising the stud 87 back to its highest position to locate surface a again in the path of the selector, see Fig. 7. During the third and fourth transfers it is not necessary to move the selector rearwardly, but to avoid undue complications the selector is operated by actuator 99 at each transfer, even though the stop head moves to its positions of Figs. 7 and 10 prior to movement of the transferrer arm 20.

Thus it will be seen that during four successive replenishing operations the selector effects delivery of bobbins from the stacks in the order 11, 12, 14, 13, one bobbin being drawn from each stack, and the lever 85 and its stop head being returned to starting position after four transfers. Working surfaces I and IV are substantially similar to each other as to their location and the effect of cooperating with their respective hooks 75 is to produce one step movements of the lever 85. Working surfaces II and III are similar to each other, but their hooks 75 cause two step movements of lever 85.

The matter thus far described is for a setting of the magazine in which all four stacks supply weft to the same shuttle. In the modification of the invention, however, it is possible to effect delivery of bobbins from the front three stacks 11, 12 and 13, only.

In the modified form of the invention illustrated more particularly in Figs. 17, 18, 19 and 22 to 24, lever 85 is replaced by a different type of lever mounted on a pivot to one side of the mid-position between the releasers 16 and 17.

Also, the lay is provided with a single shuttle box 104, Fig. 22, to receive one at a time the two shuttles with which the loom operates. Accordingly, a stand 110 supported on the magazine carries a stud 111 similar to stud 82 except that it is located rearwardly of the mid-position between releasers 16 and 17. Stud 111 has mounted thereon hub 112 of a lever 113 so made that in one setting thereof it assumes three angular positions, one for each of the stacks 11, 12 and 13. For convenience, however, the lever is made so that in another setting it will be similar in operation to lever 85. Lever 113 therefore has two groups of working surfaces for hooks 75, one group $I^3$, $II^3$ and $III^3$ for three cell delivery and the other group $I^4$, $II^4$, $III^4$ and $IV^4$ for four cell delivery. The second group corresponds, respectively, to surfaces I, II, III and IV of lever 85, except that they are modified slightly due to the location of stud 111. When the lever is in the position shown in Fig. 18 these surfaces $I^4$ to $IV^4$ are located in the same position as their corresponding surfaces of lever 85, as indicated by lines k—k, l—l, m—m, and n—n, respectively.

A removable stud 115 similar to stud 87 cooperates with connector 89 and is held to lever 113 by a nut 116 which permits stud 115 to be removed and applied to either end of lever 113. When lever 113 is set as shown in Fig. 18 it will operate as does lever 85 to give the stop head four different vertical positions each of which causes the selector to register with a different one of the four bobbin releasers, and these two levers 85 and 113 cause release of bobbins from the stacks of the magazine in the same order.

When it is desired to set the magazine so that it will deliver bobbins of the same kind from only three stacks, however, lever 113 is reversed on stud 111 to occupy the position shown in Figs. 22 to 24. The stud 115 is changed to the right end of the lever and is connected to rod 89 as in the preferred form.

In this reversed position all of the previously operative working surfaces $I^4$ and $IV^4$ are now out of the working range of the hooks 75 and the working surfaces $I^3$, $II^3$ and $III^3$ become operative. In this reversed position the last named surfaces occupy the same general positions as those occupied by the surfaces I, II and III of lever 85, see lines k—k, l—l and m—m.

In this reversed position of lever 113 the magazine can be used to deliver bobbins of the same kind from three stacks for the replenishment of one shuttle, but the rear stack of the magazine will have a different weft for the replenishment of a second shuttle. When the latter is active a connector 117 moves lever 36 rearwardly to register the selector with releaser 18. Replenishment of the second shuttle, however, should not disturb the lever 113. As showing a convenient means for preventing this disturbance lever 113 is provided with a depression 120 between the working surfaces $I^4$ and $II^4$. Hook 75 on the rear releaser 18 can therefore have its vertical reciprocation incident to a replenishment from stack 14 without causing angular movement of lever 113, and the sequence of bobbin deliveries from the front three stacks will not be interrupted.

Assuming the parts are as shown in Fig. 22 with stud 115 in its highest position, stop surface a will effect registry of the selector 25 with the front releaser 15. As the hook 75 of releaser 15 descends it will engage working surface $I^3$ and move the lever 113 to the position shown in Fig. 23 so that the stop head falls on the selector. When the latter is moved rearwardly by actuator 99 it permits the stop head to fall so that the stop surface $b$ is in the path of the selector to cause registry of the latter with releaser 16. When releaser 16 descends its hook engages working surface $II^3$ and rocks the lever 113 to the position shown in Fig. 24 through substantially the same angular distance that it had been moved previously by the front hook 75. In this respect surface $II^3$ differs from surface $II^4$, and in order to effect less angular movement of lever 113 by the hook of releaser 16, the surface $II^3$ is at a lower level than surface $II^4$ so that less of the working stroke of the hook of releaser 16 is utilized. At transfer surface $c$ falls into the path of the selector to register the latter with releaser 17, see Fig. 24. When the third releaser 17 descends its hook will engage surface $III^3$ and restore the lever 113 to its starting position with surface $a$ again effecting registry of the selector with releaser 15.

The invention is not necessarily limited to the type of reversal set forth for lever 113, since it is sufficient if the lever when in one position presents four working surfaces by the hooks 75, and when in a different position presents three different working surfaces for the front three hooks 75. It will be apparent that in this second setting of lever 113 only the stop surfaces $a$, $b$ and $c$ will become positioned to register the selector 25, the top surface $d$ never reaching a position where it can act as a stop for the selector.

Under some conditions it is observed that movement of the stop positioning lever by releaser 18 causes excessive upward movement of the stop head so that the latter may not be able to assume its correct stopping position by the time spring 105 returns the selector 25 to the position where it should engage surface $c$. The previously described spring 90, however, exerts a slight downward force on the stop head rod and prevents the aforesaid excess upward movement of the stop. The spring 90 is not necessary in the setting shown in Fig. 22 and has been omitted in that figure, nor will the spring always be necessary in the preferred form but it may assist in looms running at high speed.

In both forms of the invention provision is made to move the detector D forwardly at transfer to remove it from the path of the incoming bobbin and also prevent indication of weft exhaustion on the transferring beat. This is an old feature in multi-color weft replenishing looms, but in the present instance there is an added reason for preventing indication, namely, the fact that actuator 99 moves the selector rearwardly at a time when the selector could rock if the detector indicated. Such rocking might result in breakage of the fingers 27 and 28, or the lower lugs 22 on the releasers. The aforesaid result is effected by a stud 125 on the transferrer arm 20 which engages a lug 126 on detector slide 49 to move the latter and the detector forwardly at transfer.

The stop 92 shown in Fig. 25 is of such height that it is likely to interfere with the spring plunger holder for the front pair of releasers 15 and 16. The invention has been operated successfully with the construction shown in Fig. 1 in which the plunger releaser holder 128 is in the usual position as set forth in Chevrette Patent No. 1,510,765. We find in certain instances that it is desirable to change the location of this plunger carrier as indicated in Figs. 27 to 29 with respect at least to the front pair of releasers. Accordingly we provide a carrier 130 having a horizontal web 131 with an outer flange 132 through which pass spring plungers 133 and 134 for releasers 15 and 16, respectively. The carrier has a vertical wall 135 and a reinforcing flange 136 and is secured to the magazine frame below the selector 25 instead of above. The wall 135 is made long enough to extend across the magazine plate 32 and have guiding relation with the vertical releaser 17. The carrier 130 is secured to the magazine by screws 137 and 138.

The releasers 15 and 16 are formed substantially as shown in Fig. 29 and have the wedge 140 below the bottom lug 22. The upper part of the releasers 15 and 16 are formed without the wedge 68' shown in Fig. 2 and the customary guide plates are used instead of the carrier 128.

By the use of this improved carrier 130 ample room is provided above the selector 25 to permit the stop 92 to rise to its highest position without interference. If desired the right edge of web 131 can be provided with a notch 145 as indicated in Fig. 28 to provide clearance for the rear leg of the stop when the latter is in its lowest position. The form of carrier shown in Figs. 27 to 29 is not essential but is convenient.

From the foregoing it will be seen that simple means has been provided by which four stacks of similar bobbins in a stationary magazine may be caused to deliver bobbins in rotation for replenishments involving a single type of weft. The bobbin delivery mechanism, however, is not necessarily limited to use with the shifting gang of shuttle boxes G. It will also be seen that by providing means for moving the selector rearwardly to a noninterfering position incident to each replenishing operation, the stop head may fall to certain of its stopping positions in the path of the selector. This mechanism does not require connection with drop boxes at the opposite end of the loom as has been necessary in previously proposed constructions, and permits use of the invention in the weaving of such fabrics as bordered towels which may require two or more replenishments during the weaving of a block of one color. While the transferrer arm is shown for effecting this temporary movement of the selector the invention is not necessarily thus limited, but it is desirable to have some part which moves incident to a replenishing operation to effect this movement of the selector in order to reduce the number of movements of the latter to a minimum. It will further be seen that in the modified form of the invention a positioning lever or the like has been provided which can assume three different angular positions for drawing bobbins from the front three stacks. Also, in order to convert from four to three stack delivery, or vice versa, lever 113 can assume two different settings in one of which four working surfaces cooperate with the releaser hooks when four stacks of the magazine deliver bobbins of the same kind. In the other setting three different surfaces cooperate with the releasers of three stacks when a predominant weft is replenished from three stacks of the magazine. Further, it will be seen that spring 90 prevents excess upward movement of the stop head when the controller lever therefor moves it positively away from shaft 29.

Having thus described the invention it will be seen that changes and modifications may be made therein by those skilled in the art without departing from the spirit and scope of the invention.

We claim:

1. In a weft replenishing mechanism having a plurality of bobbin stacks each provided with a bobbin releaser operated by a selector registerable with the releasers, one at a time, the mechanism having means urging the selector in one direction, a stop which when in one position and when the selector registers with and operates one releaser tends to move to a second position wherein said stop can cooperate with said means to register the selector with a different releaser, said selector when registering with said one releaser preventing movement of said stop to said second position, and means having a movement incident to a replenishing operation of said mechanism moving said selector away from said stop to permit the latter to move to said second position.

2. In a weft replenishing mechanism having a plurality of stacks of bobbins each provided with a bobbin releaser operated by a selector movable along a path to register with the releasers, one at a time, the mechanism having means urging the selector toward one end of said path, a stop for the selector tending to move from one position thereof to a different position relatively to said path incident to a replenishing operation but prevented from moving to said different position due to the fact that the selector is in an interfering position, the stop when moving to said different position cooperating with said means to register the selector with a different releaser, and means having a movement incident to each replenishing operation of the mechanism and moving said selector away from interfering position to effect movement of said stop from said one position thereof to a different position thereof relatively to said path.

3. In a weft replenishing mechanism having a plurality of stacks of bobbins each provided with a bobbin releaser operated by a selector movable along a path to register with the releasers, one at a time, the mechanism having means urging the selector toward one end of said path, a stepped stop having a plurality of positions and having movements by gravity to certain of the positions thereof when the selector is not in interfering position to place the steps thereof successively in the path of said selector, said selector normally being in interfering position to prevent movement of said stop to said certain positions, said stop cooperating with said means to register the selector with the different releasers, control means for said stop movable to permit said stop to fall successively to said certain positions thereof, and means having a movement incident to a replenishing operation of said mechanism moving the selector away from interfering position to permit said stop to fall from one to another position thereof relatively to said path.

4. In weft replenishing mechanism having two bobbin releasers to be operated successively by a selector registering with said releasers, a member having a movement incident to a weft replenishing operation consequent upon operation of one of said releasers by said selector and effective to move the selector away from a position of registry with said one selector to a temporary position, a stop for the selector moving into stopping position relatively to said selector incident to movement of the latter to said temporary position for registry of said selector with the other releaser, and means cooperating with said stop when the latter is in said stopping position to register the selector with the other releaser.

5. In weft replenishing mechanism having a series of bobbin releasers operated by a selector registerable with said releasers one at a time and urged by an actuator to move toward one end of said series, a member having a movement incident to each replenishing operation of the mechanism to move the selector away from registry with any releaser to a temporary position and thereafter cooperating with said actuator to effect return movement of the selector toward said one end of said series, and a stop moving into stopping position relatively to said selector when the latter is in said temporary position and cooperating with said actuator on said return movement of the selector to register the latter with a different releaser.

6. In weft replenishing mechanism having a series of bobbin releasers and a releaser selector registerable with said releasers one at a time and urged by an actuator toward one end of said series, a bobbin transferrer having a movement incident to a replenishing operation of said mechanism and effective when having said movement to move the selector away from registry with any releaser in said series to a temporary position, and a stop for the selector moving into stopping position incident to movement of the selector to said temporary position and cooperating with said actuator to register the selector with a different releaser.

7. In control mechanism for the bobbin stack selector of a weft replenishing loom having a series of bobbin releasers and provided with means urging the selector toward one end of said series, a selector positioner having a different position for each releaser and when in a given position cooperating with said means to register the selector with the releaser corresponding to said given position, and said positioner tending to have a movement to a different position relatively to said selector upon operation of said one releaser but prevented from having such movement due to the fact that the selector is in an interfering position, and an actuator having a movement incident to a weft replenishing operation consequent upon operation of said one releaser to move said selector away from said interfering position to a non-interfering position relatively to said positioner to permit the latter to move to said different position thereof.

8. In a weft replenishing mechanism having a plurality of stacks of bobbins each provided with a bobbin releaser operated by a selector registerable with the releasers one at a time, the mechanism having means urging the selector in one direction and provided with a member which has a movement in the opposite direction incident to a replenishing operation of the mechanism, a selector stop which when in one position and when the selector registers with and operates one releaser tends to move to a second position wherein said stop can cooperate with said means to register the selector with a different releaser, said selector when registering with said one releaser preventing movement of said stop to said second position, and mechanism operated by said member when the latter has said movement thereof to move said selector away from said stop and permit the latter to move to said second position.

9. In weft replenishing mechanism having two bobbin releasers to be operated successively by a selector registering with said releasers one after the other, a member having a movement incident to a weft replenishing operation following operation of said one releaser by said selector, mechanism moved through a given working stroke by said member when the latter has said movement to move the selector from registry with said one selector to a temporary position beyond registry with the other releaser, a stop for the selector moving into stopping position relatively to said selector incident to movement of the selector to said temporary position for registry of said selector with the other releaser, and means cooperating with said stop when the latter is in the stopping position thereof to register the selector with the other releaser.

10. In a weft replenishing mechanism having four stacks of reserve bobbins each provided with a bobbin releaser to be operated by a selector movable into registry with the releasers one at a time, the mechanism having means for urging the selector toward one end of the series and having provision for moving the selector toward the other end of the series, a stepped stop for the selector having a step for each releaser and movable successively to four different positions, one position for each releaser, and control mechanism for the stop comprising a lever connected to said stop and moved by the releasers acting one at a time to four different angular positions to effect movement of the stop to the aforesaid four positions thereof.

11. In a weft replenishing mechanism having four stacks of reserve bobbins each provided with a bobbin releaser to be operated by a selector movable into registry with the releasers one at a time, the mechanism having means for urging the selector toward one end of the series and having provision for moving the selector toward the other end of the series, a stepped stop for the selector having a step for each releaser and movable to four different positions, one position for each releaser, a lever connected to the stop and pivoted intermediate the second and third releasers and having a working surface for cooperation with each releaser, the working surfaces corresponding to the first and second releasers cooperating with the latter to effect movement of the stop to the second and fourth positions, respectively, thereof, and the third and fourth working surfaces cooperating with the associated releasers to move the lever to effect movement of the stop to the first and third positions, respectively, thereof.

12. In a weft replenishing mechanism having four stacks of reserve bobbins each provided with a bobbin releaser to be operated by a selector movable into registry with the releasers one at a time, the mechanism having means for urging the selector toward one end of the series and having provision for moving the selector toward the other end of the series, a stepped stop for the selector having a step for each releaser and movable to four different positions, one position for each releaser, a lever mechanism having a working surface for each releaser, and means connecting the lever mechanism to the stop, the working surfaces cooperating successively with the releasers corresponding thereto due to the position of the stop to cause the selector to register with each releaser once during a succession of four replenishing operations of the replenishing mechanism.

13. In a weft replenishing mechanism having a series of four bobbin releasers arranged in two pairs, the mechanism having a selector movable into registry with the releasers one at a time and having means urging the selector toward one end of the series and having other means moving the selector toward the other end of the series, a stop for the selector having a step for each releaser and movable to four positions in the path of the selector to register the latter with said releasers one at a time in cooperation with said means and other means, and lever mechanism connected to the stop and having a working surface for each releaser and movable by said releasers in rotation to four different angular positions each of which corresponds to a position of said stop.

14. In a weft replenishing mechanism having a series of four bobbin releasers and a selector movable into registry with the releasers one at a time and in a given sequence, the mechanism having means urging the selector toward one end of the series and having other means moving the selector toward the other end of the series, a stop for the selector having a step for each releaser and movable successively to four different positions relatively to the selector to register the latter with said releasers one at a time according to said sequence and in cooperation with said means and other means, and lever mechanism connected to the stop and having a working surface for cooperation with each releaser, said lever mechanism capable of assuming four different angular positions each corresponding to a different position of the stop and each releaser when cooperating with the surface corresponding thereto causing said lever mechanism to cooperate with said means and register the selector with a different releaser.

15. In a weft replenishing mechanism having a series of four bobbin releasers arranged in two pairs, the mechanism having a selector movable into registry with the releasers one at a time and having means urging the selector toward one end of the series and having additional means moving the selector toward the other end of the series, a stop for the selector having a step for each releaser and movable to four different positions relatively to the selector to register the latter with said releasers one at a time in cooperation with said means and additional means, lever mechanism pivoted intermediate the pairs of releasers and connected to the stop and capable of having four different angular positions in each of which said lever mechanism cooperates with said means and additional means to effect movement of the stop to a different stopping position with respect to the selector, operation of the first and second releasers of the first pair moving the lever mechanism to the second and fourth angular positions, respectively, thereof to cause the stop to register the selector with the second and fourth releasers, respectively, and operation of the fourth and third releasers of the second pair causing the lever mechanism to move to the third and first angular positions, respectively, thereof to effect registry of the selector by the stop with the third and first releasers.

16. In a weft replenishing mechanism having a series of four bobbin releasers arranged in two pairs, the mechanism having a selector movable into registry with the releasers one at a time and having means urging the selector toward one end of the series and having other means moving the selector toward the other end of the series, a stop for the selector having a step for each releaser and movable to four positions relatively to the selector to register the latter with said releasers one at a time in co-operation with said means and other means, lever mechanism pivoted intermediate the pairs of releasers and capable of assuming four different angular positions each corresponding to a different position of the stop with respect to the selector and cooperating with said means and other means to effect movement of the stop to the four positions thereof, said lever mechanism being given a one-step angular movement by each of the first and fourth releasers and being given a two-step angular movement by each of the second and third releasers when said releasers operate one at a time, said releasers giving the lever mechanism said one step and two-step angular movements in such order as to locate the lever mechanism once in each of the four angular positions thereof for four successive operations of the releasers.

17. In a lever for the stop of a stack selector in a multi-stack weft replenishing mechanism having two pairs of bobbin releasers, said lever having a pair of working surfaces on each side of the pivot thereof, one surface for cooperation with each releaser.

18. In a lever for the stop of a stack selector in a multi-stack weft replenishing mechanism having two pairs of bobbin releasers, said lever having a pair of working surfaces on each side of the pivot thereof, one surface for cooperation with each releaser, one working surface of each pair of surfaces being at a different elevation from the other working surface of the corresponding pair of surfaces when the lever is horizontal.

19. In a lever for the stop of a stack selector in a multi-stack weft replenishing mechanism having two pairs of bobbin releasers, said lever having a pair of working surfaces on each side of the pivot thereof, one surface for cooperation with each releaser, the pivot of the lever being nearer one of said pairs of surfaces than it is to the other pair of surfaces, and said lever having a third pair of working surfaces on one side of the pivot and another working surface on the other side of the pivot.

VICTOR H. JENNINGS.
WALTER H. WAKEFIELD.